United States Patent
Hsia et al.

(10) Patent No.: US 9,244,161 B2
(45) Date of Patent: Jan. 26, 2016

(54) ULTRASOUND TRANSMISSION CIRCUIT AND TIME DELAY CALIBRATION METHOD THEREOF

(71) Applicant: INDUSTRIAL TECHNOLOGY RESEARCH INSTITUTE, Hsinchu (TW)

(72) Inventors: Chin Hsia, Taichung (TW); Yu-Te Kao, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 372 days.

(21) Appl. No.: 13/893,127

(22) Filed: May 13, 2013

(65) Prior Publication Data
US 2014/0133270 A1    May 15, 2014

(30) Foreign Application Priority Data
Nov. 12, 2012    (TW) .............................. 101142057 A (51) Int. Cl.
| H04B 1/02 | (2006.01) |
| G01S 7/52 | (2006.01) |
| G10K 11/34 | (2006.01) |
| B06B 1/02 | (2006.01) |

(52) U.S. Cl.
CPC ............. *G01S 7/5202* (2013.01); *B06B 1/0215* (2013.01); *G01S 7/5205* (2013.01); *G10K 11/346* (2013.01); *B06B 2201/76* (2013.01)

(58) Field of Classification Search
CPC .. G01S 7/52004; G01S 7/5202; G01S 7/5205
USPC ............................................................ 367/138
See application file for complete search history.

(56) References Cited

U.S. PATENT DOCUMENTS 4,127,034 A      11/1978  Lederman et al.
4,234,940 A  *  11/1980  Iinuma ......................... 367/105
(Continued)

FOREIGN PATENT DOCUMENTS

| CN | 101023376 A | 8/2007 |
| TW | 381226 | 2/2000 |

(Continued)

OTHER PUBLICATIONS

Z. Zhao et al., "Pipeiined High Precision Beamforming Delay Calculator for Ultrasound Imaging," IEEE, 978-1-4577-1740, Jun. 2011.

(Continued)

*Primary Examiner* — Mark Hellner
(74) *Attorney, Agent, or Firm* — Muncy, Geissler, Olds & Lowe, P.C.

(57) ABSTRACT

An ultrasound transmission circuit comprises a pulse generating circuit, a feedback circuit and a processing circuit. The feedback circuit outputs a trigger signal according to a first pulse signal arriving at an ultrasound transducer. The processing circuit records a first time point at which the first pulse signal is generated, and records a second time point at which the first pulse signal arrives the ultrasound transducer according to the trigger signal. The processing circuit adjusts a first delay value according to a variance between the first time point and the second time point to generate a second delay value, and drives the pulse generating circuit according to the second delay value to generate a second pulse signal.

15 Claims, 7 Drawing Sheets

(56) References Cited

U.S. PATENT DOCUMENTS

| | | |
|---|---|---|
| 4,285,011 A | 8/1981 | Sato |
| 4,611,494 A | 9/1986 | Uchiyama |
| 4,628,738 A | 12/1986 | Burckhardt et al. |
| 4,700,573 A | 10/1987 | Savord |
| 5,388,461 A | 2/1995 | Rigby |
| 5,795,297 A | 8/1998 | Daigle |
| 6,363,033 B1 | 3/2002 | Cole et al. |
| 6,368,279 B1 | 4/2002 | Liu |
| 2004/0004905 A1* | 1/2004 | Lyon et al. ............ 367/13 |
| 2007/0239013 A1 | 10/2007 | Alexandru |
| 2011/0012662 A1* | 1/2011 | Ma et al. ............ 327/295 |

FOREIGN PATENT DOCUMENTS

| | | |
|---|---|---|
| TW | 537885 | 6/2003 |
| TW | 565694 | 12/2003 |
| TW | 200932300 A | 8/2009 |
| TW | 201114411 A | 5/2011 |

OTHER PUBLICATIONS

A. Kassem et al., "Pipelined Sampled-Delay Focusing CMOS Implementation for Ultrasonic Digital Beamforming," IEEE, 0-7695-1929, Jun. 2003.

E. Brunner, "Ultrasound System Considerations and their Impact on Front-End Components," © Analog Devices, Inc. 2002.

J.J. Huang, "Beamformer Design for a Digital Ultrasonic Imaging System," National Taiwan University, Graduate Institute of Electric Engineering, 2001 (Thesis)—w/Abstract.

I. Kim et al., "CMOS Ultrasound Transceiver Chip for High-Resolution Ultrasonic Imaging Systems," IEEE Transactions on Biomedical Circuits and Systems, vol. 3, No. 5, Oct. 2009, 1932-4545.

\* cited by examiner

ULTRASOUND TRANSMISSION CIRCUIT AND TIME DELAY CALIBRATION METHOD THEREOF

This application claims the benefit of Taiwan application Serial No. 101142057, filed Nov. 12, 2012, the disclosure of which is incorporated by reference herein in its entirety.

TECHNICAL FIELD

The disclosed embodiments relate to an ultrasound transmission circuit and time delay calibration method thereof.

BACKGROUND

An ultrasonic wave (ultrasound) is a mechanic wave generated by a piezoelectric crystal under an effect of an electric field. A sonic wave having a frequency over 20 kHz is regarded as an ultrasound. The ultrasound prevails in applications of examination, measurement and control purposes. For example, the ultrasound is applied for thickness measurement, distance measurement, medical treatments, medical diagnosis and ultrasound imaging (ultrasonography). Alternatively, by processing a material with the ultrasound, certain physical, chemical or biological properties or statuses of the material may be accelerated or changed.

An ultrasound imaging system is extensively implemented for biomedical detections. In ultrasonography, imaging is mainly achieved by pulse-echo. A principle of ultrasonography is summarized as below. A short pulse is transmitted by each array element of a transmitter. With beamforming, a time delay and a gain size of the pulses of each channel are adjusted to focus all the array signals at a position of a fixed depth on a scan line.

However, at signal transmission paths, RC delay errors resulted by hardware elements or at paths of printed circuit boards frequently demote beamforming effects from expected values. For example, complications such as lower side-lobe energy prior and subsequent to a focal point are incurred if the focal point has an excessively large radius, in a way that quality of an image converted from echo signals at a receiver is degraded.

SUMMARY

The disclosure is directed to an ultrasound transmission circuit and time delay calibration method thereof.

According to one embodiment, an ultrasound transmission circuit is provided. The ultrasound transmission circuit comprises a pulse generating circuit, a feedback circuit and a processing circuit. The feedback circuit outputs a trigger signal according to a first pulse signal arriving at an ultrasound transducer. The processing circuit records a first time point at which the first pulse signal is generated, and records a second time point at which the first pulse signal arrives the ultrasound transducer according to the trigger signal. The processing circuit adjusts a first delay value according to a variance between the first time point and the second time point to generate a second delay value, and drives the pulse generating circuit according to the second delay value to generate a second pulse signal.

According to another embodiment, a time delay calibration method is provided. The time delay calibration method comprises steps of: generating a first pulse signal according to a first delay value, and recording a first time point at which the first pulse signal is generated; outputting a trigger signal according to the first pulse signal arriving at an ultrasound transducer; recording a second time point at which the first pulse signal arrives the ultrasound transducer; adjusting a first delay value according to a variance between the first time point and the second time point to generate a second delay value; and generating a second pulse signal according to the second delay value.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
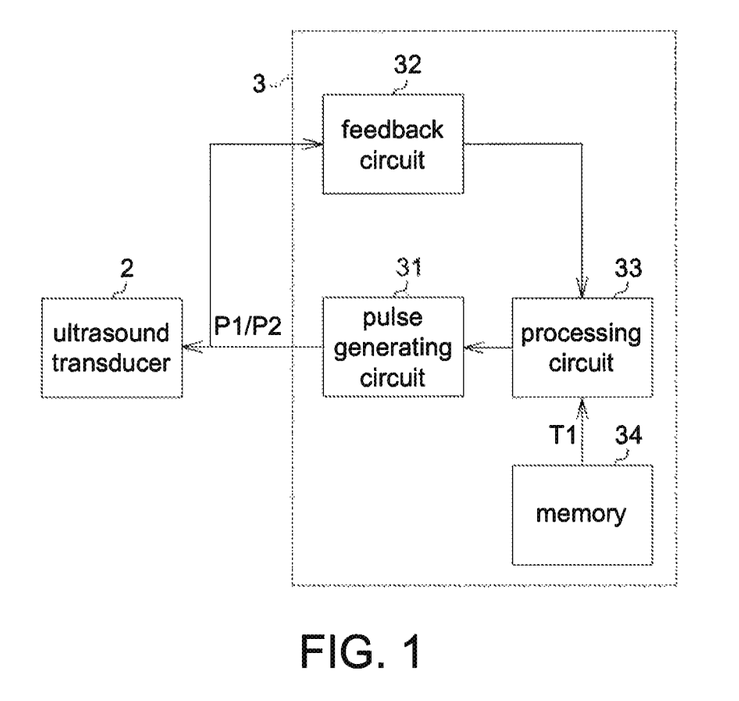
FIG. 1 is a schematic diagram of an ultrasound transducer and an ultrasound transmission circuit.
Figure 2:
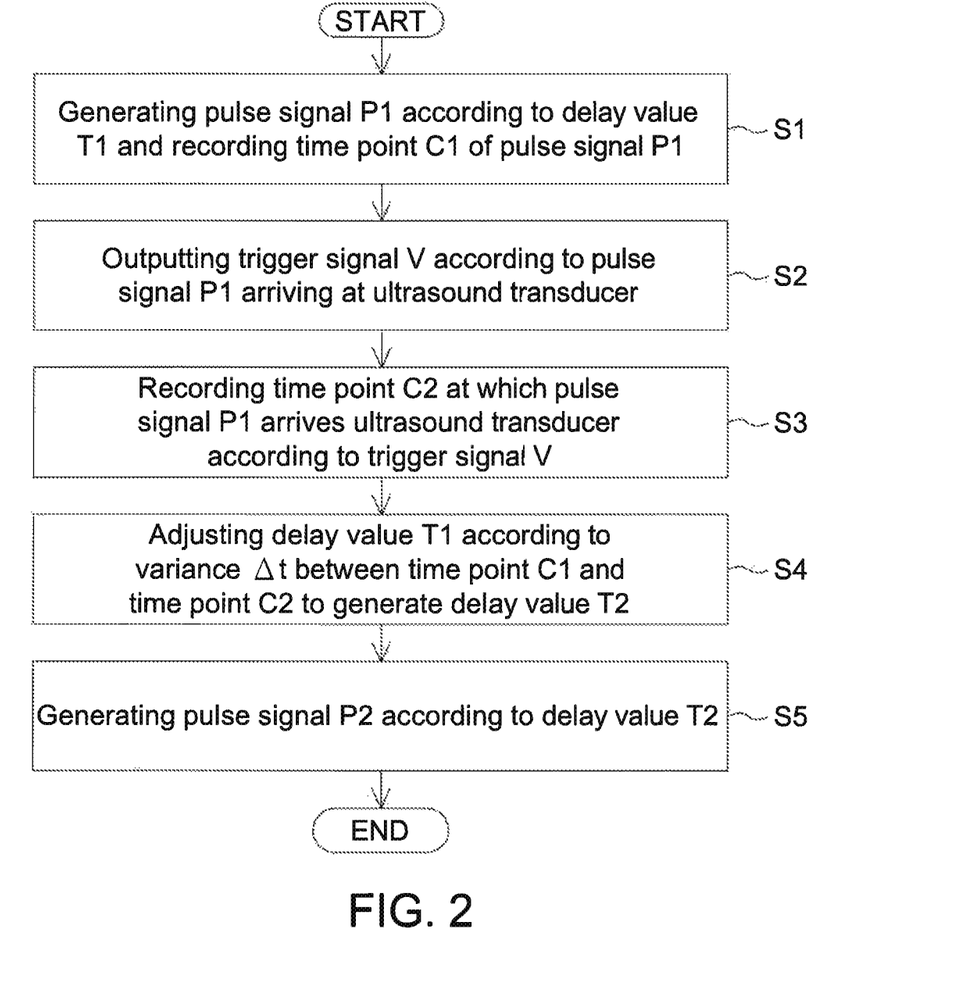
FIG. 2 is a flowchart of a time delay calibration method.
Figure 3:
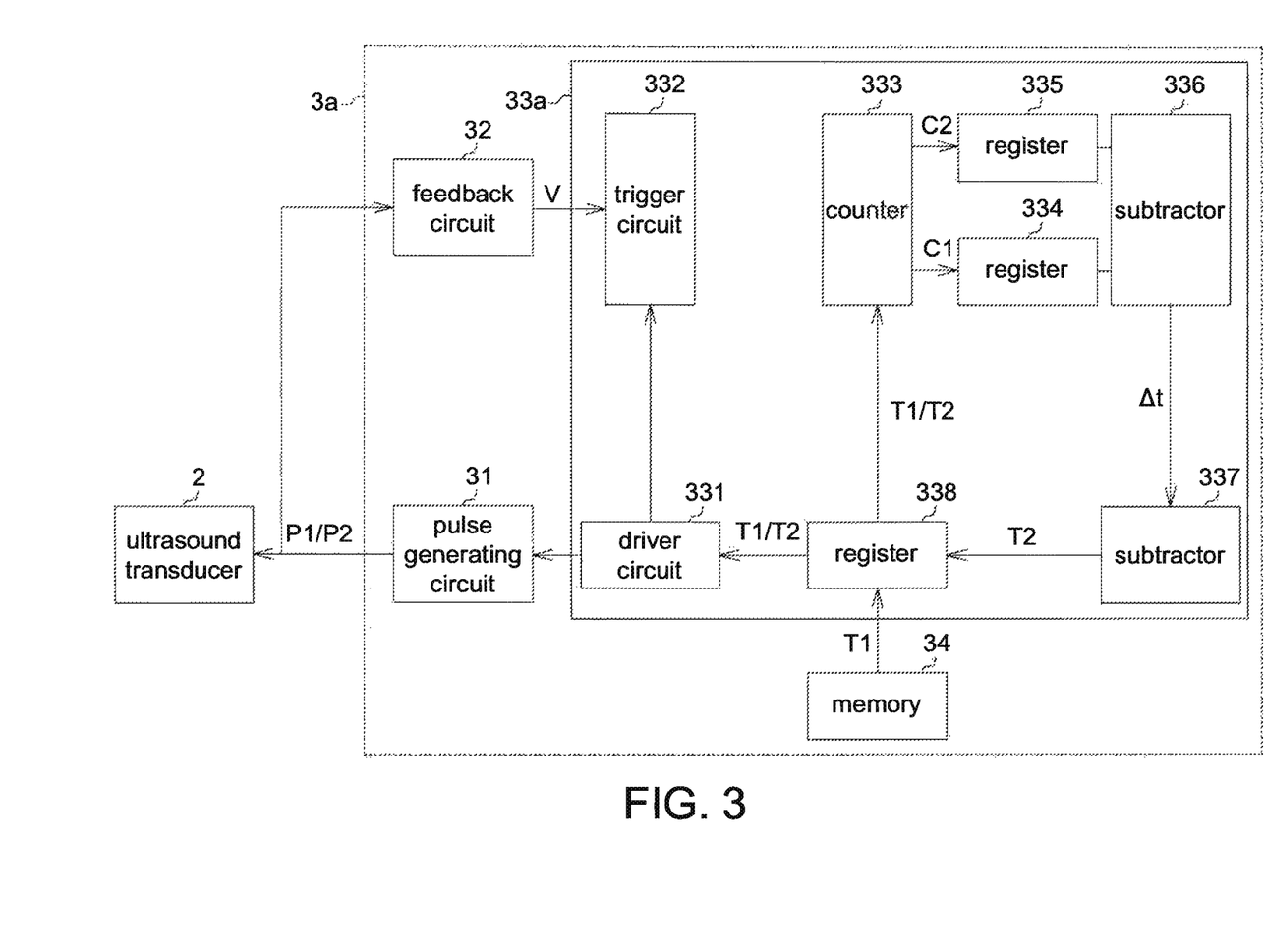
FIG. 3 is a block diagram of an ultrasound transducer and an ultrasound transmission circuit according to a first embodiment.

FIG. 1 is a schematic diagram of an ultrasound transducer and an ultrasound transmission circuit. FIG. 2 is a flowchart of a time delay calibration method. Referring to FIGS. 2 and 3, for example, an ultrasound transducer 2 is a linear, curved or phased-array transducer. An ultrasound transmission circuit 3 comprises a pulse generating circuit 31, a feedback circuit 32, a processing circuit 33 and a memory 34. The pulse generating circuit 31 comprises one or multiple pulsers. For example, the feedback circuit 32 is a current-voltage conversion circuit, which can be implemented by a current sensor, a resistance divider, a level shifter or a transceiver switch. The memory 34 stores a delay table containing a delay value T1 determined by a predetermined channel according to a focal depth. For example, the processing circuit 33 is a field programmable gate array (FPGA).

The time delay calibration method comprises the following steps. In step S1, the processing circuit 33 generates a pulse signal P1 according to the delay value T1, and records a time point C1 at which the pulse signal P1 is generated. For example, the pulse signal P1 is a high-voltage pulse signal. More specifically, the processing circuit 33 drives the pulse generating circuit 31 according to the delay value T1 in the delay table to generate the pulse signal P1, and the time point C1 is, for example, obtained by counting the number of pulses. In step S2, the feedback circuit 32 outputs a trigger signal V according to the pulse signal P1 arriving at the ultrasound transducer 2. In step S3, the processing circuit 33 records a time point C2 at which the pulse signal P1 arrives the ultrasound transducer 2 according to the trigger signal V. In step S4, the processing circuit 33 adjusts the delay value T1 according to a variance Δt between the time point C1 and the time point C2 to generate a delay value T2. In step S5, the processing circuit 33 drives the pulse generating circuit 31 according to the delay value T2 to generate a pulse signal P2. For example, the pulse signal P2 is a high-voltage pulse signal.

As the processing circuit 33 has already adjusted the delay value according to a non-expected error resulted by a transmission path before the ultrasound is transmitted, transmission energy provided by the ultrasound transducer 2 is allowed to render more concentrated beamforming. Thus, an ultrasound receiver is facilitated to process more accurate echo signals to further increase a signal-to-noise ratio (SNR). Moreover, the ultrasound transmission circuit 3 having uncomplicated hardware designs not only favors a manufacturing process but can also be readily integrated with an ultrasound system.

First Embodiment

FIG. 3 is a block diagram of an ultrasound transducer and an ultrasound transmission circuit according to a first embodiment. In the first embodiment, the ultrasound transmission circuit and a processing circuit are exemplified by an ultrasound transmission circuit 3a and a processing circuit 33a, respectively. The processing circuit 33a comprises a driver circuit 331, a trigger circuit 332, a counter 333, a register 334, a register 335, a subtractor 336, a subtractor 337, and a register 338. The driver circuit 331 drives the pulse generating circuit 31 according to the delay value T1 in the delay table to generate the pulse signal P1, and records the time point C1 at which the pulse signal C1 is generated to the register 334. For example, the driver circuit 331 reads the time delay value T1 from the register 338, whereas the time point C1 at which the pulse signal P1 is generated is obtained by the counter 333 counting the number of pulses.

The trigger circuit 332 triggers the counter 333 according to the trigger signal V, and records the time point C2 at which the pulse signal P1 arrives the ultrasound transducer 2 to the register 335. For example, the time point C2 at which the pulse signal P1 arrives the ultrasound transducer 2 is obtained by the counter 333 counting the number of pulses. The subtractor 336 subtracts the time point C1 from the time point C2 to obtain a variance Δt, which represents a non-expected delay error resulted by a transmission path. The subtractor 337 subtracts the variance Δt from the delay value T1 to generate a delay value T2, and the register 338 records the delay value T2. The driver circuit 331 drives the pulse generating circuit 31 according to the delay value T2 to generate the pulse signal P2.

Figure 4:
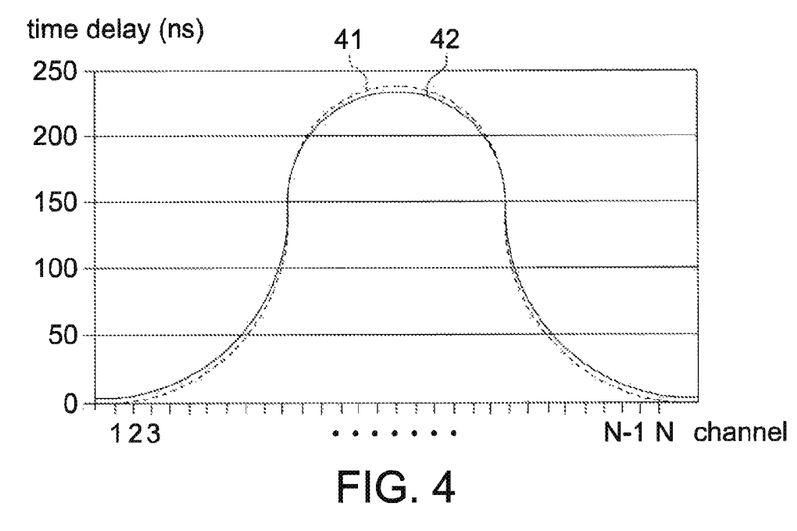
FIG. 4 is a time delay resulted by an ultrasound transmission circuit before calibration.
Figure 5:
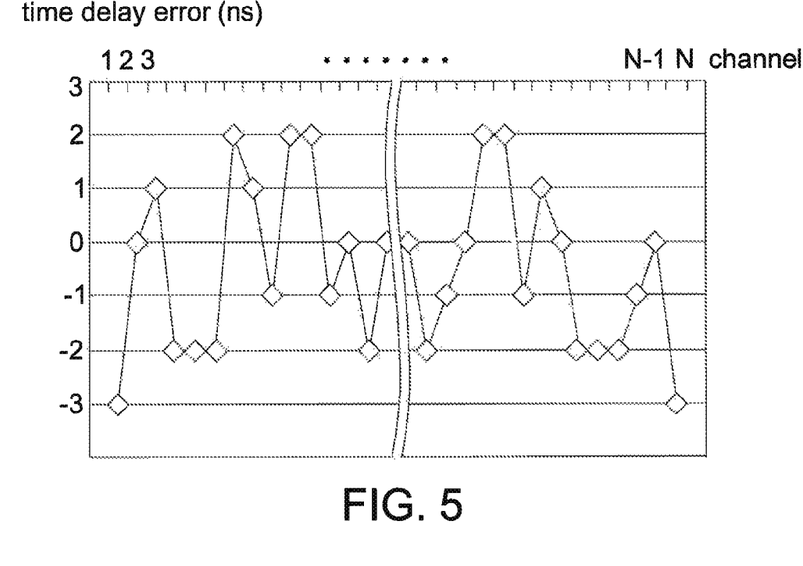
FIG. 5 is a time delay error resulted by an ultrasound transmission circuit before calibration.
Figure 6:
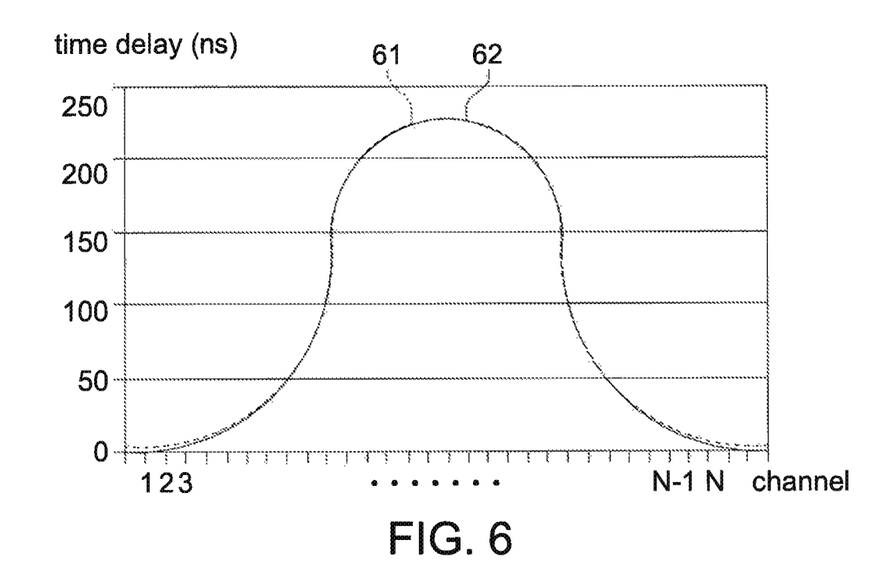
FIG. 6 is a time delay resulted by an ultrasound transmission circuit after calibration.
Figure 7:
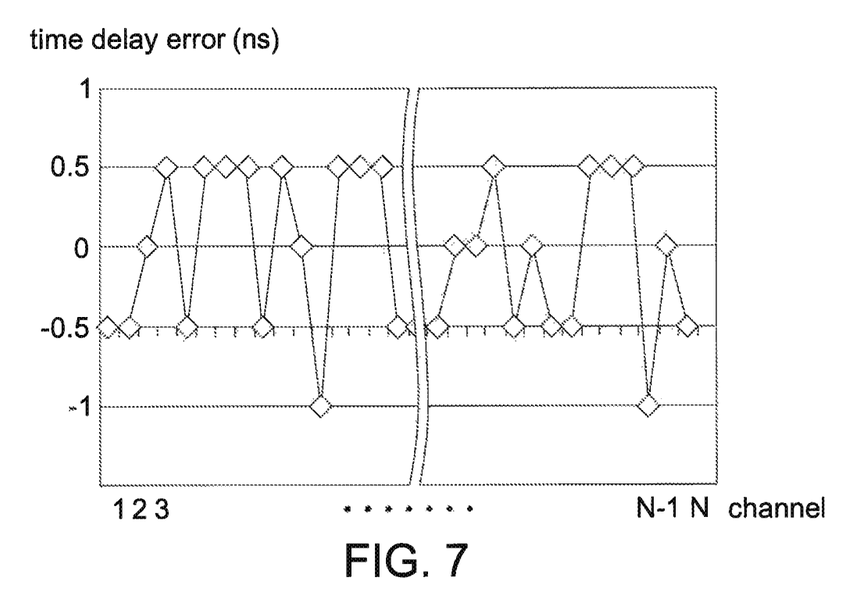
FIG. 7 is a time delay error resulted by an ultrasound transmission circuit after calibration.

Refer to FIGS. 1, 3, 4, 5, 6, and 7. FIG. 4 is a time delay resulted by an ultrasound transmission circuit before calibration. FIG. 5 is a time delay error resulted by an ultrasound transmission circuit before calibration. FIG. 6 is a time delay resulted by an ultrasound transmission circuit after calibration. FIG. 7 is a time delay error resulted by an ultrasound transmission circuit after calibration. In FIGS. 4 and 6, the horizontal axis represents 1 to N channels of the ultrasound transducer, and the vertical axis represents the time delay of the 1 to N channels. The foregoing 1 to N channels may also be referred to as 1 to N unit arrays. In FIGS. 5 and 7, the horizontal axis represents the 1 to N channels of the ultrasound transducer, and the vertical axis represents the time delay error of the 1 to N channels. FIGS. 5 and 7 are respectively obtained according to FIGS. 4 and 6.

Referring to FIG. 4, a curve 42 represents a predetermined time delay of the channels, and a curve 41 represents a measured time delay of the channels before calibration. The curve 41 may be recorded in the memory 34. The variance between the curve 42 and the curve 41 is represented by the time delay error depicted in FIG. 5. Referring to FIG. 6, a curve 62 represents the predetermined time delay of the channels, with the predetermined time delay of the channels being the delay value T1 in FIG. 3. Similarly, a curve 61 represents the measured time delay of the channels after calibration, with the measured time delay of the channels as depicted by the delay value T2 in FIG. 3. The curve 62 may be recorded in the memory 34.

After generating the pulse signal P1 according to the corresponding delay T1 indicated by the curve 62, the variance Δt between the time point C1 at which the pulse signal P1 is generated and the time point C2 at which the pulse signal P1 arrives the ultrasound transducer 2 represents the non-expected delay error resulted by a transmission path. The processing circuit 33a adjusts the delay value T1 according to the variance Δt to generate the delay value T2. The delay value T2 corresponding to different channels is as indicated by the curve 61. The variance between the curve 62 and the curve 62 is represented by the time delay error depicted in FIG. 7. As clearly seen from FIGS. 5 and 7, the generated time delay error after calibration is smaller than the generated time delay error before calibration.

Second Embodiment

Figure 8:
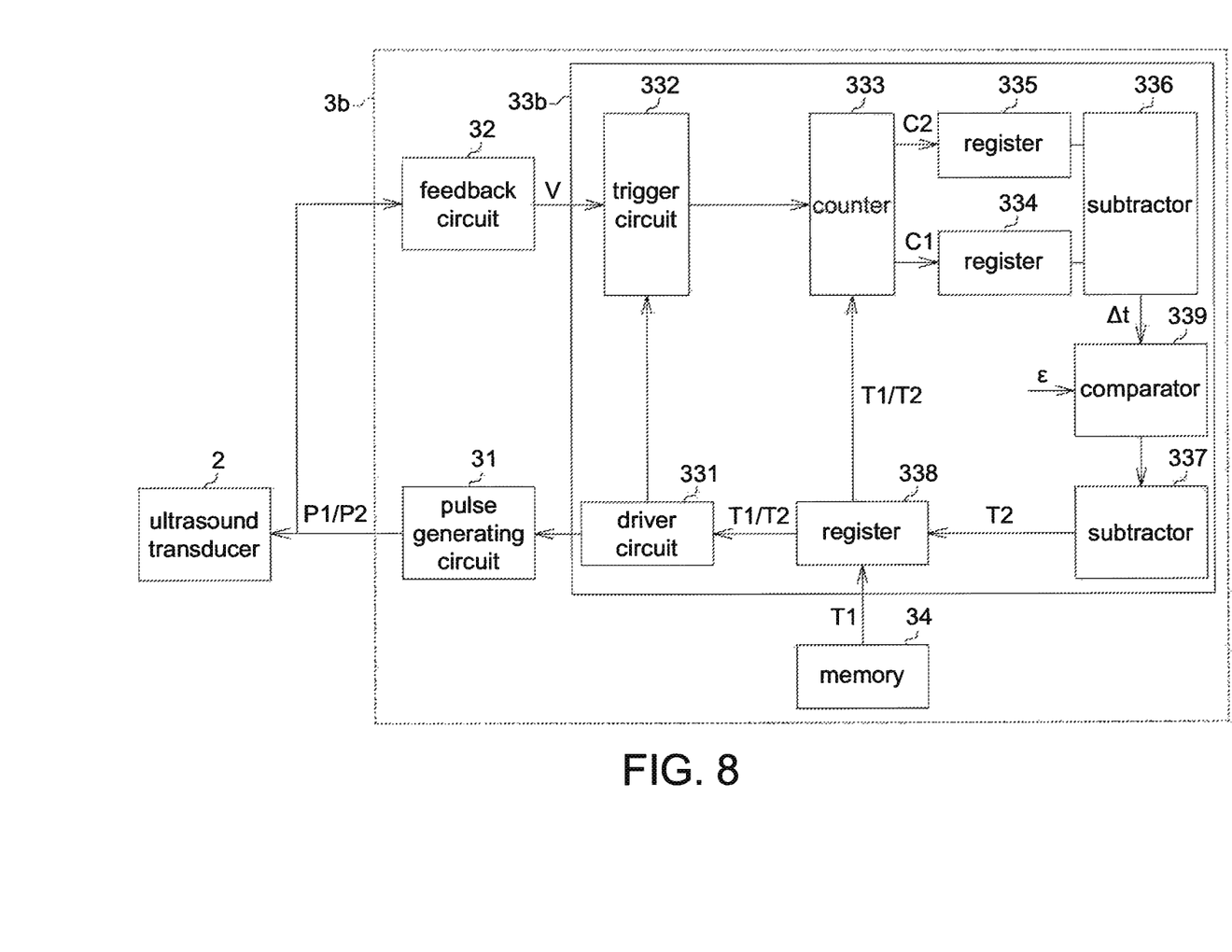
FIG. 8 is a block diagram of an ultrasound transducer and an ultrasound transmission circuit according to a second embodiment.

FIG. 8 is a block diagram of an ultrasound transducer and an ultrasound transmission circuit according to a second embodiment. In the second embodiment, the ultrasound transmission circuit and a processing circuit are exemplified by an ultrasound transmission circuit 3b and a processing circuit 33b, respectively. A main difference of the second embodiment from the first embodiment is that, the processing circuit 33b of the ultrasound transmission circuit 3b further comprises a comparator 339. The comparator 339 determines whether the variance Δt is smaller than a predetermined value ε. The processing circuit 33b stops adjusting the delay value T1 when the Δt is smaller than the predetermined value ε. That is to say, when the Δt is smaller than the predetermined value ε, the subtractor 337 neither subtracts the variance Δt from the delay value T1 nor generates the delay value T2. Meanwhile, the register 338 preserves the original delay value T1.

Third Embodiment

Figure 9:
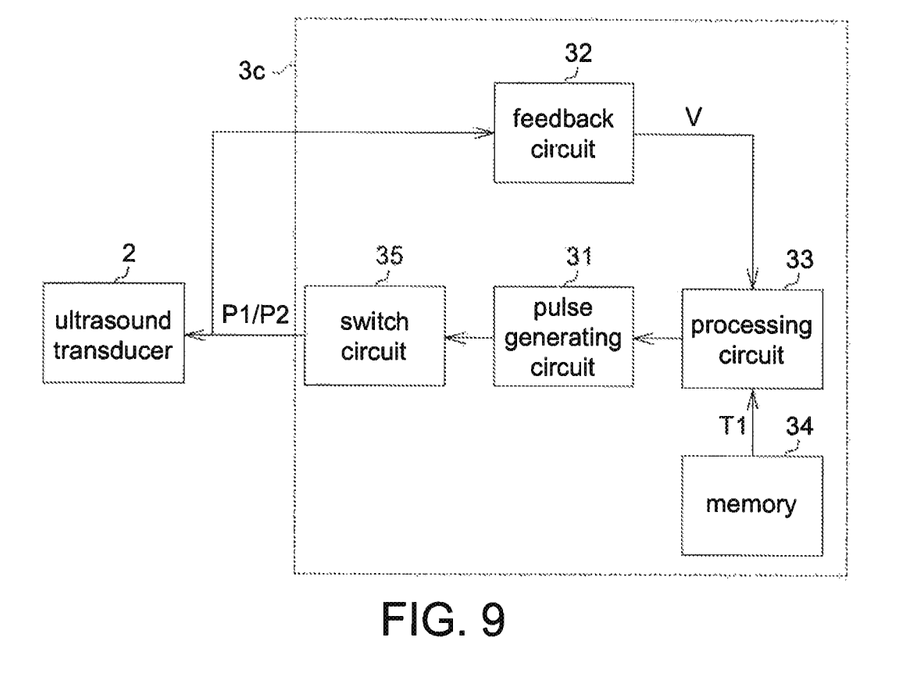
FIG. 9 is a schematic diagram of an ultrasound transducer and an ultrasound transmission circuit according to a third embodiment.

FIG. 9 is a schematic diagram of an ultrasound transducer and an ultrasound transmission circuit according to a third embodiment. In the third embodiment, the ultrasound transmission circuit is exemplified by an ultrasound transmission circuit 3c. A main difference of the third embodiment from the second embodiment is that the ultrasound transmission circuit 3c further comprises a switch circuit 35. For example, the switch circuit 35 is a multiplexer/demultiplexer. When the ultrasound transducer 2 has multiple channels, the switch circuit 35 selectively outputs the pulse signal to a corresponding channel. The feedback circuit 32 senses the high-voltage pulse signal P1 between the ultrasound transducer 2 and the switch circuit 35, and outputs the corresponding trigger signal V according to the high-voltage pulse signal P1.

Figure 10:
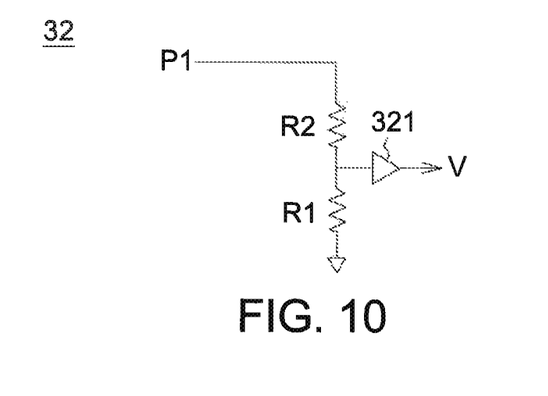
FIG. 10 is a schematic diagram of a feedback circuit.

FIG. 10 is a schematic diagram of a feedback circuit. For example, the feedback circuit 32 comprises a resistor R1, a resistor R2 and a buffer 321. The pulse signal P1 is divided by the resistors R1 and R2, and the trigger signal V is outputted via the buffer 321.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An ultrasound transmission circuit, comprising:
 a pulse generating circuit;
 a feedback circuit, for outputting a trigger signal according to a first pulse signal arriving at an ultrasound transducer; and
 a processing circuit, for driving the pulse generating circuit according to a first delay value to generate the first pulse signal to the ultrasound transducer, recording a first time point at which the first pulse signal is generated, recording a second time point at which the first pulse signal arrives the ultrasound transducer, adjusting the first delay value according to a variance between the first time point and the second time point to generate a second delay value, and driving the pulse generating circuit to generate a second pulse signal according the second delay value.

2. The ultrasound transmission circuit according to claim 1, wherein the processing circuit determines whether the variance is smaller than a predetermined value, and stops adjusting the first delay value when the variance is smaller than the predetermined value.

3. The ultrasound transmission circuit according to claim 2, wherein the processing circuit further comprises:
 a comparator, for determining whether the variance is smaller than the predetermined value.

4. The ultrasound transmission circuit according to claim 1, further comprising:
 a memory, for storing a delay table;
 wherein, the processing circuit comprises a driver circuit, and the driver circuit drives the pulse generating circuit according to the first delay value in the delay table to generate the first pulse signal.

5. The ultrasound transmission circuit according to claim 1, wherein the processing circuit comprises:
 a first register, for recording the first delay value;
 a second register;
 a third register, for recording the second delay value;
 a counter, for counting the first time point and the second time point; and
 a trigger circuit, for triggering the counter according to the trigger signal to record the second time point to the second register.

6. The ultrasound transmission circuit according to claim 1, wherein the processing circuit comprises:
 a subtractor, for subtracting the first time point from the second time point to generate the variance.

7. The ultrasound transmission circuit according to claim 1, wherein the processing circuit comprises:
 a subtractor, for subtracting the variance from the first delay value to generate the second delay value.

8. The ultrasound transmission circuit according to claim 1, further comprising:
 a switch circuit, coupled between the ultrasound transducer and the processing circuit;
 wherein, the first pulse signal is a high-voltage pulse signal, and the feedback circuit senses the high-voltage pulse signal between the ultrasound transducer and the switch circuit.

9. The ultrasound transmission circuit according to claim 1, wherein the feedback circuit is a current-voltage conversion circuit.

10. The ultrasound transmission circuit according to claim 1, wherein the processing circuit comprises:
 a driver circuit, for driving the pulse generating circuit according to the first delay value to generate the first pulse signal, and driving the pulse generating circuit according to the second delay value to generate the second pulse signal.

11. A time delay calibration method, comprising:
 generating a first pulse signal according to a first delay value, and recording a first time point at which the first pulse signal is generated;
 outputting a trigger signal according to the first pulse signal arriving at a ultrasound transducer;
 recording a second time point at which the first pulse signal arrives the ultrasound transducer according to the trigger signal;
 adjusting the first delay value according to a variance between the first time point and the second time point to generate a second delay value; and
 generating a second pulse signal according to the second delay value.

12. The time delay calibration method according to claim 11, further comprising:
 determining whether the variance is smaller than a predetermined value;
 wherein, the first delay value is no longer adjusted when the variance is smaller than the predetermined value.

13. The time delay calibration method according to claim 11, wherein the step of generating the first pulse signal generates the first pulse signal according to the first delay value in a delay table.

14. The time delay calibration method according to claim 11, wherein the variance is equal to the second time point subtracted by the first time point.

15. The time delay calibration method according to claim 11, wherein the second delay value is equal to the first delay value subtracted by the variance.

* * * * *